Nov. 25, 1969  C. KOCH  3,479,945
PHOTOGRAPHIC FOCUSING CAMERA
Filed July 6, 1967  3 Sheets-Sheet 1
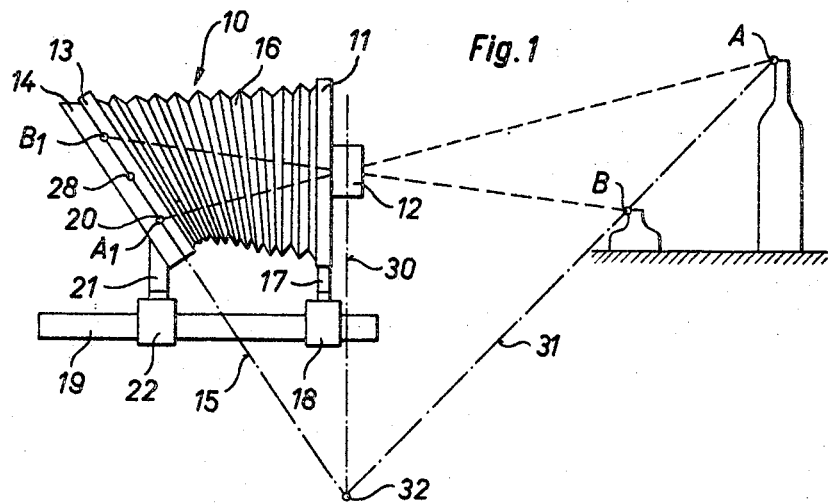
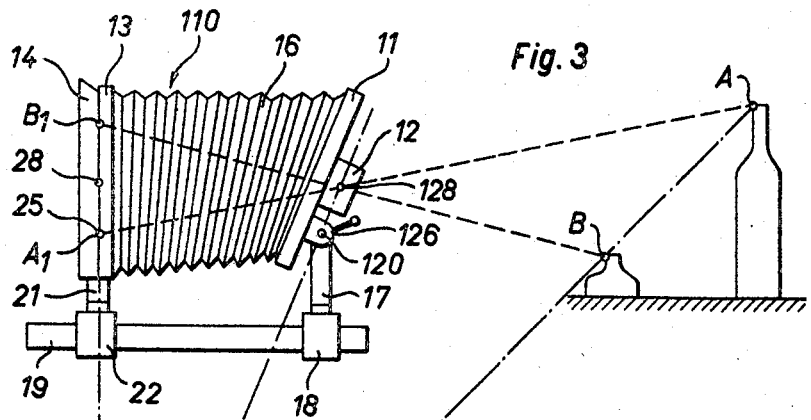
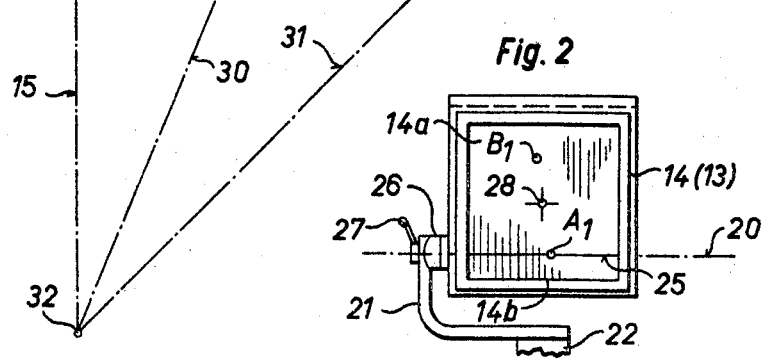
INVENTOR.
Carl Koch
BY
Watson, Cole, Grindle + Watson
Attys.

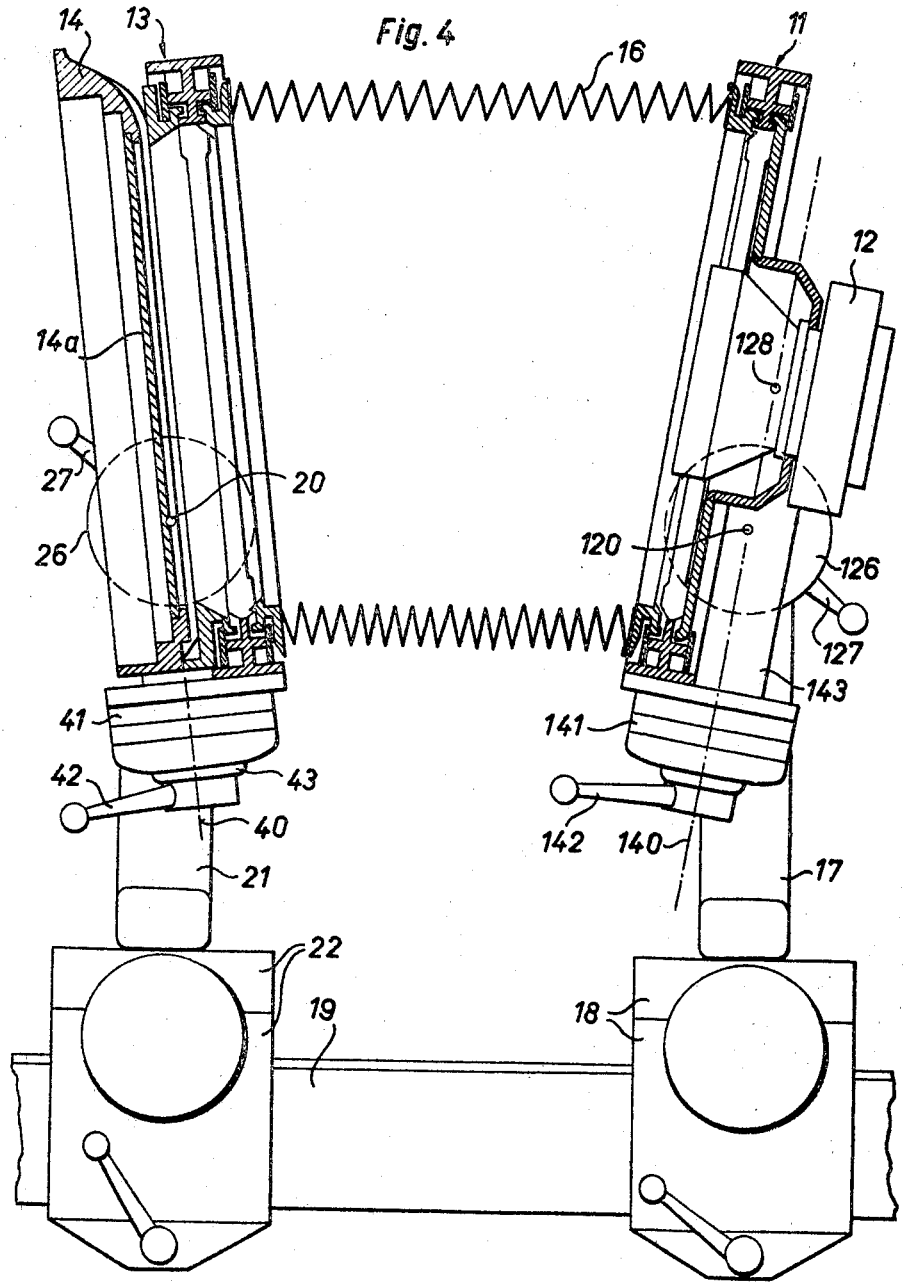

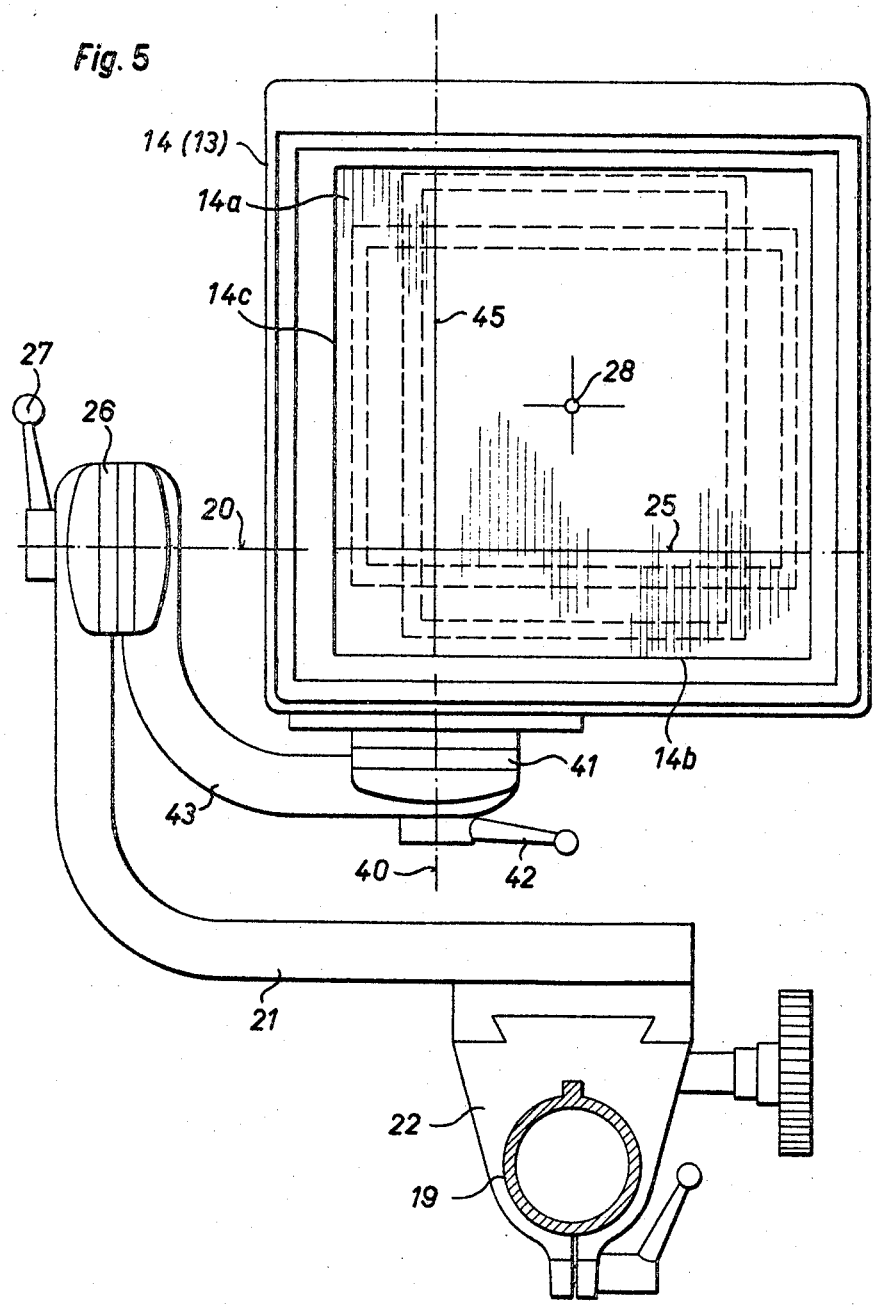

3,479,945
PHOTOGRAPHIC FOCUSING CAMERA
Carl Koch, Schaffhausen, Switzerland, assignor to Sinar AG Schaffhausen, Feuerthalen, Switzerland
Filed July 6, 1967, Ser. No. 651,436
Claims priority, application Switzerland, July 8, 1966, 10,137/66
Int. Cl. G03b 17/12, 19/02
U.S. Cl. 95—50
10 Claims

ABSTRACT OF THE DISCLOSURE

A photographic focusing screen camera in which the distance between the lens carrier and the picture carrier is adjustable and having a base on which the carriers are mounted. At least one of the carriers being pivotally mounted on the base and a focusing screen is associated with the picture carrier. The adjustable carrier being at a distance from a center of the movable carrier which is smaller than a distance of an edge of the focusing screen running parallel to the swing axis from a center of the focusing screen.

---

The present invention relates to a photographic fousing screen camera in which the distance between the carrier of the lens and the picture carrier is adjustable and at least one of the mentioned carriers arranged on a connected basis is additionally swivelable around at least one axis that is parallel to the pertinent carrier and in relation to the connecting basis.

Cameras of the above mentioned type are used particularly by expert photographers. In contrast to a camera whose lens carrier and picture carrier are not swivelable with relation to their connecting base, a camera of the type described here will permit, for example, a simultaneous clear picture of two or three object points lying at different distances from the camera and/or the adjustment of perspective distortions of the image, for example the erection of converging verticals, which are images of perpendicular edges of the object to be photographed.

Two fundamentally different mechanical designs of the swivelable lens or picture carriers have been known, namely such with a so-called central swing and others with a so-called base swing. In the case of the design with a central swing, the swinging axes pass as much as possible through the center of the lens or of the focusing screen of the camera, whereas in the case of the design with a base swing, the horizontal swinging axes are arranged on the connecting base of the two carriers and thus are located completely outside the focusing screen and the lens. The perpendicular swinging axes of the lens and of the picture carrier run, even in the constructional type of known cameras mentioned in second-mentioned construction, as much as possible through the center of the focusing screen and of the lens. Both known swing types have advantages and disadvantages.

The central swing has the advantage that by a swinging action the middle distance or pull-out of the camera, that is to say the distance of the centers of the fousing screen and of the lens are practically unchanged, and that, consequently, a picture point depicted clearly in the center of the focusing screen will still remain clearly focused even when carrying out a swing of the picture carrier. The fact that the advantage mentioned will not exist, whenever the object to be photographed does not have a focusing point depicted in the center of the focusing screen, or else whenever instead of the picture carrier the lens carrier will be swiveled, constitutes a disadvantage. Indeed, the lens has not been corrected for an image field located on a spherical surface, but for a level image field, and for this reason the central beam is always shorter than the beams running obliquely in relation to the optical axis. After swiveling of the lens carrier, a light beam of different length, running differently, will be used for depicting the central point on the focusing screen, and for this reason one will have to focus anew. A further disadvantage is to be found in the fact that in case the picture carrier has been swiveled around the horizontal axis, it will be possible in many cases to insert the magazine for the negative broadside only in case the picture carrier has been mounted swivelably on carrier arms that are bent in the direction toward the lens. However, such bent carrier arms impose some limits to the reduction of the draw on the camera, which make more complicated the use of an extremely short focus, wide angle lens.

As compared to this, the base swing has the advantage of a large area of swing of the picture carrier and the lens carrier, without the insertion of the magazine for the negatives broadside being impeded in the case of any swing position of the picture carrier. Furthermore, it will be possible to build the picture and the lens carrier, because of the deep shifting of the horizontal swiveling axis, so flat that they can be pushed together very close, which makes the use of an extremely short focus lens possible without difficulties and without any particular aids. On the other hand, the fact that they swing around the horizontal axes will bring about a greater change of the camera draw than in the case of the central swing and that, at the same time, the camera draw will be changed for each picture point which will be disadvantageous.

According to previous statements, in the case of the central swing as well as the base swing, a determinable disadvantage lies in the face that in both cases it will be fairly awkward and time consuming to focus clearly and simultaneously on the focusing screen, the images of two or even three points of the object located at different distances from the camera by corresponding change of the camera draw and slanting of the image and/or of the lens carrier.

The object in connection with which the present invention is based is to eliminate the described disadvantages of the hitherto known swinging arrangements on a focusing screen camera of the type mentioned initially.

This object is solved by the camera according to the invention, in which the distance between the lens carrier and the picture carrier is adjustable and in which at least one of the above mentioned carriers, arranged on a connecting base, is additionally swivelable in relation to said connecting base around at least one axis which is parallel to the pertinent carrier and which runs outside of the center of the pertinent carrier. The invention is to be found mainly in the fact that the swinging axis of the swivelable lens or picture carrier is at a distance from the center of this carrier, which distance is smaller than the distance of an edge of the focusing screen which is in parallel to the swinging axis, from the center of said screen. At the same time, the focusing screen can advantageously be provided with a visible marking corresponding to the swing axis, which is at a distance from the center of the focusing screen, which distance agrees at least approximately with the distance of the swing axis from the center of the carrier that can be swiveled around said axis.

In the case of a particularly practical design, the distance of the swing axis from the center of the carrier, swivelable around said axis, is larger than half the distance of the edge of the focusing screen, running parallel to the swing axis, from the center of said screen.

Preferably, two swing axes dissecting each other at right angles have been provided for the swivelable carrier, both of said axes having the above mentioned characteristics according to the invention. Only the picture carrier or only the lens carrier may be swivelable in the above stated manner. It will be more practical, however, to have both carriers developed swivelably, whereby, advantageously, the swing axes of the picture carrier and of the lens carrier, running in parallel to one another, will have coinciding distances from the centers of these carriers. It will be advantageous to the purpose if the swing axes of the picture carrier agree precisely with the corresponding markings on the focusing screen.

The development of the camera according to the invention brings about a number of advantages, which together with further details and characteristics of the invention will become clear from the description which will now follow as to structures given by way of example of the object of the invention, from the pertinent drawings and from the claims. In the drawings, three different constructions of the object of the invention have been illustrated purely by way of example. In the drawings:

FIGURE 1 is a diagrammatic side view of a camera with a picture carrier swivelable around a horizontal axis, whereby, by way of explanation of the correct adjustment, two objects are produced with one point in each which has to be projected sharply, FIG. 2 is a rear view of a part of the camera of FIG. 1, with a view of the focusing screen, FIG. 3 is a side view similar to FIG. 1 showing a camera whose lens carrier is swivelable around a horizontal axis, FIG. 4 is a side view partly in a perpendicular longitudinal section, showing an actual design of a camera in which both the picture carrier and the lens carrier are swivelable each around a horizontal axis and around an approximately perpendicular axis, and FIG. 5 is a rear elevation of the camera as in FIG. 4 and with a view of the focusing screen.

The focusing screen photographic camera 10, shown in FIG. 1 of the drawings, has on its front end a lens carrier 11 with a photographic lens 12 and at its rear end a picture carrier 13, which has been provided with a focusing screen built into a frame 14. In a known manner, not shown, one can attach a magazine with light sensitive photographic material to the picture carrier 13, by either taking off, first of all, the focusing screen by means of its frame 14 or by inserting a magazine between the picture carrier 13 and the frame 14 for the focusing screen, whereby the focusing screen frame is simply pushed back counter to the influence of the holding springs. 15 designates the picture plane, in which the ground side of the focusing screen or the light sensitive layer of the photographic material is located, depending on whether the focusing screen or the magazine is arranged in a ready-to-use position on the picture carrier 13. Between the lens carrier 11 and the picture carrier 13 there is a light-tight, folding cover or bellows 16.

The lens carrier 11 is attached to a holder 18 by means of a standard 17, which holder has been attached slideably and fixably on a base 19 developed as an optical bank. The picture carrier 13 is connected with a standard 21 swivelably around a horizontal swing axis 20, said standard 21 being attached to a holder 22, which has likewise been attached slidably and fixably on the camera base 19. By shifting at least one of the holders 18 or 22 along the base 19, the camera draw between the lens carrier 11 and the picture carrier 13 can be changed in a known manner.

For practical purposes, the base 19 may be attached to a tripod, not shown, for the support of the entire camera. The means that have been provided for this purpose have likewise not been shown.

The swing axis 20 of the picture carrier 13, which has already been mentioned, runs in the picture plane 15 and, according to FIG. 2, has been marked on the focusing screen 14a by a visually recognizable line 25, with which the swing axis 20 coincides. In the case of the design shown and given by way of example, the swing axis 20 has been defined by a joint 26, which has been arranged between the picture carrier 13 and the standard 21, bent L-shaped. The joint 26 is fixable with the aid of a band operated lever 27 in the position to which it had been adjusted at any one time. The swing axis 20 will run neither through the center 28 of the focusing screen 14a or the picture carrier 13, nor will it run close by the base 19 as in the case of the known designs with a central swing or base swing. Rather, the swing axis 20 will have a distance from the center 28, which is smaller than the distance of the lower (or upper) edge 14b of the focusing screen which is in parallel to the swing axis. It will be to the purpose if the distance of the swing axis 20 from the center 28 is somewhat larger than half the distance of the edge 14b of the focusing screen from its center.

Both the meaning and the purpose of the described arrangement of the swing axis 20 of the picture carrier 13 can be seen from the subsequent description of a specific design of the camera by way of example and according to FIG. 1.

It is assumed that two object-points A and B, which are at different distances from the lens 12 of the camera, are to be pictured clearly and simultaneously by means of one photographic exposure, whereby the stretch or distance between the two points to be pictured $A_1$ and $B_1$, FIG. 2, is supposed to fill in, in the photographic picture to some extent, the camera format available. In order to achieve this goal, one will proceed as follows: When the picture carrier 13 at first is still in a parallel position to the lens carrier 11, the camera 10 will be brought into the correct position, so that on the focusing screen 14a the picture $A_1$ of one of the object-points A will be on the marking line 25, and the picture $B_1$ of the other object-point B will be visible at not too great a distance from the opposing, in this example, upper edge of the focusing screen, as can be seen from FIG. 2. Then, by shifting or sliding of the standard 17 or 21 along the base 19, the picture point $A_1$ is focused sharply on the marked line 25. Because of the smaller distance of point B from the lens 12, the picture point $B_1$ would now still appear blurred. By the simple swinging of the picture carrier 13 around its swing axis 20, it will now be possible also to focus the picture point $B_1$ sharply on the focusing screen, without, at the same time, changing the sharpness of the picture point $A_1$. When the two picture points $A_1$ and $B_1$ have been adjusted sharply on the focusing screen, the picture carrier 13 assumes the position shown in FIG. 1, in which Scheimpflug's law has been fulfilled. The latter states that for the simultaneous sharp depicting of two points A and B, the picture plane 15, the main plane 30 of the lens 12 and a plane 31 containing the two object-points A and B must intersect in one common straight line or point 32. In the case of the presentation in FIG. 1, the above mentioned planes 15, 30 and 31 are at right angles to the plane of the drawing, so that they can be presented as straight lines. The common line or point of intersection 32 also stands perpendicularly in relation to the plane of the drawing and therefore appears as a point.

After the camera 10 has been adjusted in the manner described, the magazine with the light sensitive photographic material is attached to the picture carrier 13 and the photographic picture is taken in the usual manner.

One can see that the adjustment of the picture carrier 13 in the properly inclined position is particularly simple with the aid of the arrangement of the swing axis 20 of the picture carrier according to the invention, because the critical focusing of the two picture points $A_1$ and $B_1$ can be accomplished successively and, in the case of the critical focusing of the second picture point, the sharpness of the first picture point will not be lost, assuming that the first picture point has been adjusted to the marked line 25. This simple and rapid method of operation is not possible with the known central swing nor with a base swing.

The focusing screen photographic camera 110, shown, in FIG. 3, differs from the one described merely by the fact that instead of the picture carrier 13, in this case the lens carrier 11 is swivelable around a horizontally running axis 120. This swing axis 120 has been defined by a fixable joint 126 which has been arranged between the lens carrier 11 and the standard 17 in such a manner that the swing axis 120 will lie at least approximately in the main plane 30 of the lens 12. The distance of the swing axis 120 from the center 128 of the lens 12 is of the same length as the distance of the visible marked line 25 on the focusing screen from the center 28 of said screen.

The method of use of the camera 110 according to FIG. 3 is fundamentally the same as described in FIGS. 1 and 2. The sole difference consists in this, that for a critical focusing of the picture point $B_1$, in this case it will not be the picture carrier 13 but the lens carrier 11 which is swung around the swing axis 120, whereby the picture point $A_1$ does shift, to be sure, under certain circumstances, a little beside the marked line 25, but the previously focused sharpness of the picture point $A_1$ will be forfeited less strongly than in the case of the central swing of the lens. If one shifts the lens carrier 11 subsequently in the plane 30, until the picture point $A_1$ will again lie on the marked line 25, the focusing of the picture point $A_1$ will be largely and automatically corrected.

In the case of the focusing screen camera shown in FIGS. 4 and 5, both the lens carrier 11 and the picture carrier 13 are swivelable in relation to the camera base 19. Two swing axes, intersecting one another at right angles, have been provided for each carrier 11 or 13, of which axes the one runs horizontally in the base position of the camera and the other one runs perpendicularly. The two horizontal swing axes have been designated analogously to the preceding designs given by way of example, with 20 or 120 and have been defined by adjustable joints 26 and 126 on the standards 17 and 21. The position of the axes 20 and 120 is the same as in the case of the above described designs given by way of example according to FIGS. 1 and 2 or according to FIG. 3. On the focusing screen 14a, again there is a visible marked line 25 (FIG. 5), which coincides with the horizontal swing axis 20 of the picture carrier 13.

The second swing axis of the picture carrier 13, which has already been mentioned, has been designated by 40 in FIGS. 4 and 5 and has been defined through a joint 41, which is fixable by means of a hand lever 42 in the desired swivel position. The two joints 26 and 41 are connected with one another by an L-shaped carrying arm 43, as can be clearly seen in FIG. 5. The swing axis 40 lies in the picture plane of the camera and runs outside the center 28 of the focusing screen 14a or of the picture carrier 13. The distance of the swing axis 40 from the center 28 is smaller than the distance of the edge 14c of the focusing screen, which adjoins the swing axis and is parallel thereto, from the center 28. In the case of a square focusing screen, the two intersecting swing axes 20 and 40 will run preferably at the same distance from the center 28. The focusing screen 14a carries a second visible marked line 45, which coincides with the second swing axis 40 whenever the focusing screen assumes its position of use.

The second swing axis of the lens carrier 11 has been designated with 140 in FIG. 4 and it is defined by a joint 141, which can be fixed in the desired position by means of the hand lever 142 and which is connected with the joint 126 by an L-shaped carrier arm 143, completely analogously as shown in FIG. 5 for the picture carrier 13. The swing axis 140 runs, just like the axis 120, at least approximately in the main plane of the lens 12 and, for practical purposes, it is at the same distance from the center 128 of the lens as is the second swing axis 40 from the center 28 of the focusing screen.

The last described camera according to FIGS. 4 and 5 does not only permit the method of operation of everyone of the designs given by way of example and described further in the foregoing, but it permits an entire series of other uses and combinations. Thus, it will be possible, for example, for a photographic picture of the two object-points A and B (FIGS. 1 and 3) to swing both the picture carrier 13 and the lens carrier 11 in relation to the base 19 of the camera, in order to achieve a simultaneously sharp picture of both picture points $A_1$ and $B_1$ and to obtain simultaneously a certain perspective effect of the picture. It is reminded that, quite generally, the swiveling of the picture carrier will bring about a change of both the sharpness and of the perspective, whereas the swiveling of the lens carrier will be followed merely by a change in the sharpness of various picture points.

If the points of the object on the focusing screen that are to be developed simultaneously sharply do not appear approximately perpendicularly one above the other, but at least approximately horizontally one beside the other, then it will be necessary to swing the picture carrier 13 or/and the lens carrier 11 around the second swing-axis 40 or 140 in order to achieve the adjustment of sharpness, after first the picture of the one object-points has been aligned with the marking line 45 and has been critically focussed.

If three points of objects lying at various distances from the lens and which, moreover, are not located on one straight line are to be depicted sharply on the focusing screen, then this too can be achieved in a simple manner with the camera according to FIGS. 4 and 5, by proceeding as follows. First of all, in the case of an aproximately parallel position of the lens carrier 11 and the picture carrier 13, the camera will be aligned in such a manner that the picture of the one point of the object will come to lie on the point of intersection of the two marking lines 25 and 45 on the focusing screen, while the pictures of the two other points of the object will appear at other points of the focusing screen. Then the picture of the point of the object located in the intersecting point of the marking lines 25 and 45 will be adjusted sharply by a change of the camera draw. After that, the pictures of the two other points of the object can likewise be adjusted sharply on the focusing screen by a swing of the picture carrier 13 or/and of the lens carrier 11 around the two intersecting swing axes 20 and 40 or 120 and 140, without the critical focusing of the first picture point being lost thereby. Finally, the pictures of all three object-points will be adjusted simultaneously and sharply.

With the hitherto known swinging arrangements in the case of universal focusing screen cameras, this result, if it can be achieved at all, can be achieved only with great trouble and sometimes by repeated testing, which is not only time consuming but also puts the achievement of a maximum performance in doubt.

It is pointed out that a straight line in space is always defined absolutely by two points of this straight line, and a plane, through three points. This geometric fact brings about the result that after the critical focusing of the picture of two object-points, every additional point which lies on the straight line of connection between the two object-points will likewise be automatically pictured sharply on the focusing screen. Likewise, after critical focusing of three object-points, every additional point too will appear as a sharp picture on the focusing screen, every point, that is, that lies in the plane which is defined by the three object-points.

In the case of a variation of design, that has not been shown, of the camera as to FIGS. 4 and 5, the lens carrier 11 could be swivelable if need be around two axes passing through the center 128 of the lens 12, while the swing axes 20 and 40 of the picture carrier 13 are arranged in the described and shown manner.

I claim:

1. A photographic focusing screen camera, in which the distance between a lens carrier and a picture carrier is adjustable, comprising a base on which the carriers are mounted and at least one of the carriers being adjustable on the base, means to pivotally mount one of the carriers relative to the base around at least one axis which is parallel to the carrier and which passes outside the center of the carrier, and a focusing screen associated with the picture carrier, a swing axis for the adjustable carrier being at a distance from a center of the movable carrier which is smaller than a distance of an edge of the focusing screen running parallel to the swing axis, from a center of said focusing screen.

2. A photographic focusing camera according to claim 1, in which the distance of the swing axis from the center of the carrier which is movable around said axis, is longer than half the distance of the edge of the focusing screen, which is parallel to the swing axis, from the center of said focusing screen.

3. A photographic focusing camera according to claim 1 in which a visible marking is provided on the focusing screen corresponding to the swing axis and provided at a distance from the center of the focusing screen coinciding at least approximately with the distance of the swing axis from the center of the movable carrier.

4. A photographic focusing camera according to claim 1, in which the picture carrier is movable and its swing axis coincides with a marking on the focusing screen.

5. A photographic focusing camera according to claim 1, in which the picture carrier and the lens carrier are pivotally mounted around an axis passing outside its center and the swing axes of both carriers running at least approximately at the same distance from the center of the carriers.

6. A photographic focusing camera according to claim 1, in which at least one of the carriers is swivelable additionally around a second swing axis which crosses the first-mentioned swing axis at right angles and is at a distance from the center of the carrier which is less than the distance of an edge of the focusing screen which is parallel to the second-mentioned swing axis from the center of said focusing screen.

7. A photographic focusing camera according to claim 1, in which at least one of the carriers is swivelable additionally around a second swing axis which crosses the first-mentioned swing axis at right angles and is at a distance from the center of the carrier which is less than the distance of an edge of the focusing screen which is parallel to the second-mentioned swing axis from the center of said focusing screen, and in which a visible marking is provided on the screen corresponding to the second-mentioned swing axis, said marking being at a distance from the center of the focusing screen, coinciding at least approximately with the distance of the second-mentioned swing axis from the center of the carrier swivelable around this axis.

8. A photographic focusing camera according to claim 1, in which at least one of the carriers is swivelable additionally around a second swing axis which crosses the first-mentioned swing axis at right angles and is at a distance from the center of the carrier which is less than the distance of an edge of the focusing screen which is parallel to the second-mentioned swing axis from the center of said focusing screen, and in which the distance of the second-mentioned swing axis from the center of the carrier swivelable around this axis, is longer than half of the distance of the edge of the focusing screen which runs parallel to the second-mentioned swing axis, from the center of said focusing screen.

9. A photographic focusing camera according to claim 1, in which at least one of the carriers is swivelable additionally around a second swing axis which crosses the first-mentioned swing axis at right angles and is at a distance from the center of the carrier which is less than the distance of an edge of the focusing screen which is parallel to the second-mentioned swing axis from the center of said focusing screen, and in which the picture carrier is additionally swivelable around the second-mentioned swing axis which coincides with a marking of the second-mentioned swing axis on the focusing screen.

10. A photographic focusing camera according to claim 1, in which the picture carrier and the lens carrier are additionally swivelable around a second swing axis passing outside the center, and in which the second-mentioned swing axis of both carriers passes at least approximately at the same distance from the center of the carriers.

References Cited

UNITED STATES PATENTS

| | | | |
|---|---|---|---|
| 762,164 | 6/1904 | Gundermann | 95—50 |
| 1,410,127 | 3/1922 | Roussilhe | 95—50 |

FOREIGN PATENTS

| | | |
|---|---|---|
| 267,705 | 1/1950 | Switzerland. |
| 968,873 | 8/1950 | France. |

NORTON ANSHER, Primary Examiner

D. B. WEBSTER, Assistant Examiner